US012689441B2

(12) United States Patent
Sasai et al.

(10) Patent No.: US 12,689,441 B2
(45) Date of Patent: Jul. 21, 2026

(54) MONITORING OF RELAY NODE IN OPTICAL TRANSMISSION SYSTEM

(71) Applicant: NTT, Inc., Tokyo (JP)

(72) Inventors: Takeo Sasai, Musashino (JP);
Masanori Nakamura, Musashino (JP)

(73) Assignee: NTT, Inc., Tokyo (JP)

( * ) Notice: Subject to any disclaimer, the term of this patent is extended or adjusted under 35 U.S.C. 154(b) by 258 days.

(21) Appl. No.: 18/682,358

(22) PCT Filed: Sep. 13, 2021

(86) PCT No.: PCT/JP2021/033580
§ 371 (c)(1),
(2) Date: Feb. 8, 2024

(87) PCT Pub. No.: WO2023/037553
PCT Pub. Date: Mar. 16, 2023

(65) Prior Publication Data
US 2025/0233664 A1      Jul. 17, 2025

(51) Int. Cl.
*H04B 10/294* (2013.01)
*H04B 10/079* (2013.01)
*H04J 14/02* (2006.01)

(52) U.S. Cl.
CPC ..... *H04B 10/294* (2013.01); *H04B 10/07955* (2013.01); *H04J 14/02216* (2023.08)

(58) Field of Classification Search
CPC ............. H04B 10/294; H04B 10/07955; H04J 14/02216
See application file for complete search history.

(56) References Cited

U.S. PATENT DOCUMENTS

| | | | |
|---|---|---|---|
| 6,023,366 A | 2/2000 | Kinoshita | |
| 2002/0039226 A1* | 4/2002 | Murakami | ........ H04J 14/02212 359/337 |

(Continued)

FOREIGN PATENT DOCUMENTS

| | | |
|---|---|---|
| JP | H05-292033 A | 11/1993 |
| JP | H09-321701 A | 12/1997 |

(Continued)

OTHER PUBLICATIONS

"Takeo Sasai et al., "Digital Backpropagation for Optical Path Monitoring: Loss Profile and Passband Narrowing Estimation", ECOC2020, Paper Tu2D.1, 2020".

(Continued)

*Primary Examiner* — Casey L Kretzer
(74) *Attorney, Agent, or Firm* — Harness, Dickey & Pierce, P.L.C.

(57) ABSTRACT

An aspect of the present invention is an optical transmission system in which one or more optical transmitters and one or more optical receivers perform communication via an optical transmission path, the optical transmission path including a plurality of relay nodes including optical amplifiers that amplify optical signals, the one or more optical transmitters transmitting optical signals at a plurality of channel frequencies, the one or more optical receivers estimating variations in intensities of the optical systems on the optical transmission path for each of the plurality of channel frequencies, the optical transmission system including: a network controller that acquires estimation information indicating a result of estimating the variations from the one or more optical receivers and acquires gain spectra of the optical amplifiers in the optical transmission path on the basis of the acquired plurality of pieces of estimation information.

7 Claims, 13 Drawing Sheets

(56) References Cited

U.S. PATENT DOCUMENTS

| | | | | |
|---|---|---|---|---|
| 2012/0121259 A1* | 5/2012 | Kuwata | ............... | H04B 10/673 |
| | | | | 398/38 |
| 2019/0074903 A1 | 3/2019 | Takamuku et al. | | |
| 2022/0416890 A1 | 12/2022 | Sasai et al. | | |
| 2023/0106338 A1 | 4/2023 | Sasai et al. | | |

FOREIGN PATENT DOCUMENTS

| | | |
|---|---|---|
| JP | 2014-195149 A | 10/2014 |
| WO | WO-2017/217217 A1 | 12/2017 |
| WO | WO-2021/124415 A1 | 6/2021 |
| WO | WO-2021/199317 A1 | 10/2021 |

OTHER PUBLICATIONS

"Takeo Sasai et al., Revealing Raman-amplified Power Profile and Raman Gain Spectra with Digital Backpropagation, in OFC2021, Paper M3I.5".

Takeo Sasai et al., "Digital Longitudinal Monitoring of Optical Fiber Communication Link", Journal of Lightwave Technology, Dec. 29, 2021.

Dietrich Marcuse et al., "Application of the Manakov-PMD Equation to Studies of Signal Propagation in Optical Fibers with Randomly Varying Birefringence", Journal of Lightwave Technology, Sep. 1997, vol. 15, No. 9, pp. 1735-1746.

Multispan optical transmission line monitoring technology by learning nonlinear Schrödinger equation, Business Communication, 2021, vol. 58, No. 6, pp. 22-25.

Takeo Sasai et al., "Digital Backpropagation for Optical Path Monitoring—Loss and Dispersion Profile Estimation-", IEICE Technical Report, Jan. 7, 2021, OCS2020-39, pp. 61-64.

International Search Report in Application No. PCT/JP2022/002185, Apr. 12, 2022.

T. Sasai et al., "Simultaneous Detection of Anomaly Points and Fiber types in Multi-span Transmission Links Only by Receiver-side Digital Signal Processing", OFC2020, Paper Th1F.1, 2020.

T. Sasai et al., "Physics-oriented learning of nonlinear Schrodinger equation: optical fiber loss and dispersion profile identification", arXiv:2104.05890, 2021.

T. Tanimura et al., "Fiber-Longitudinal Anomaly Position Identification Over Multi-Span Transmission Link Out of Receiver-end Signals", J. Lightw. Technol., 38(9), 2020.

M. K. Barnoski et al., "Fiber waveguides: a novel technique for investigating attenuation characteristics", Applied Optics, 15(9), pp. 2112-2115, 1976.

S. Furukawa et al., "Enhanced Coherent OTDR for Long Span Optical Transmission Lines Containing Optical Fiber Amplifiers", IEEE Photon. Technol. Lett., 7(5), pp. 540-542, 1995.

A. Matsushita et al., "High-Spectral-Efficiency 600-Gbps/Carrier Transmission Using PDM-256QAM Format", Journal of Lightwave Technology, 37(2), 2019.

T. Tanimura et al., "Experimental Demonstration of a Coherent Receiver that Visualizes Longitudinal Signal Power Profile over Multiple Spans out of Its Incoming Signal", ECOC2019 PD.3.4, 2019.

IP E et al: "Compensation of Dispersion and Nonlinear Impairment Using Digital Backpropagation", Journal of Lightwave Technology, IEEE, USA, vol. 26, No. 20, Oct. 15, 2008 (Oct. 15, 2008), pp. 3416-3425, XP011241197, ISSN: 0733-8724, DOI: 10.1109/JLT.2008.927791.

Asif Rameez et al: "Optimized digital backward propagation for phase modulated signals in mixed-optical fiber transmission links", Optics Express,, vol. 18, No. 22, Oct. 25, 2010 (Oct. 25, 2010), p. 22796, XP002715061, DOI: 10.1364/OE.18.022796 [retrieved on Oct. 13, 2010].

* cited by examiner

MONITORING OF RELAY NODE IN OPTICAL TRANSMISSION SYSTEM

CROSS-REFERENCE TO RELATED APPLICATIONS

This application is a 371 U.S. National Phase of International Application No. PCT/JP2021/033580, filed on Sep. 13, 2021. The entire disclosure of the above application is incorporated herein by reference.

TECHNICAL FIELD

The present invention relates to an optical transmission system, a network controller, and an optical transmission method.

BACKGROUND ART

Conventionally, a relay node including an optical amplifier (hereinafter, also referred to as a "light amplifier") such as an erbiullldoped fiber amplifier (EDFA) or a forward/backward Raman amplifier is inserted at a midpoint of a transmission path (optical fiber) in order to compensate for a loss of an optical signal in the transmission path in an optical transmission system (see Non Patent Literature 1, for example). Such a light amplifier has properties such as a gain (the amount of amplification) and a tilt (a frequency property of the gain and a gain spectrum), and a dedicated device such as an optical spectrum analyzer (OSA) is used to measure the properties in many cases (see Non Patent Literature 2, for example). Also, in regard to the above point, Non Patent Literature 3 describes visualization of an optical power for each distance over an entire multi-span link by using a signal waveform acquired by a coherent receiver disposed on a receiver side. Once a light amplifier is incorporated in a transmission system and its operation is started, the light amplifier is monitored by an optical channel monitor (OCM) or the like that plays a role of an OSA in a relay node.

CITATION LIST

Patent Literature

Patent Literature 1: WO 2021/124415 A

Non Patent Literature

Non Patent Literature 1: T. Sasai, et al., "Simultaneous Detection of Anomaly Points and Fiber types in Multi-span Transmission Links Only by Receiver-side Digital Signal Processing", OFC2020, Paper Th1F.1.
Non Patent Literature 2: T. Sasai, et al., "Physics-oriented learning of nonlinear Schrodinger equation: optical fiber loss and dispersion profile identification", arXiv: 2104.05890.
Non Patent Literature 3: T. Tanimura, et al., "Fiber-Longitudinal Anomaly Position Identification Over Multi-Span Transmission Link Out of Receiver-end Signals", J. Lightw. Technol., 38(9), 2020.

SUMMARY OF INVENTION

Technical Problem

However, it is necessary to branch the signal from the transmission path and to measure it in the conventional monitoring method, and there is thus a likelihood that a signal power loss corresponding thereto happens and this leads to degradation of signal quality.

In view of the above circumstances, an object of the present invention is to provide a technique that enables monitoring of a relay node while curbing degradation of signal quality in an optical transmission system.

Solution to Problem

An aspect of the present invention is an optical transmission system in which one or more optical transmitters and one or more optical receivers perform communication via an optical transmission path, the optical transmission path including a plurality of relay nodes including optical amplifiers that amplify optical signals, the one or more optical transmitters transmitting optical signals at a plurality of channel frequencies, the one or more optical receivers estimating variations in intensities of the optical systems on the optical transmission path for each of the plurality of channel frequencies, the optical transmission system including: a network controller that acquires estimation information indicating a result of estimating the variations from the one or more optical receivers and acquires gain spectra of the optical amplifiers in the optical transmission path on the basis of the acquired plurality of pieces of estimation information.

An aspect of the present invention is a network controller of an optical transmission system in which one or more optical transmitters and one or more optical receivers perform communication via an optical transmission path, the optical transmission path including a plurality of relay nodes including optical amplifiers that amplify optical signals, the one or more optical transmitters transmitting optical signals at a plurality of channel frequencies, the one or more optical receivers estimating variations in intensities of the optical signals on the optical transmission path for each of the plurality of channel frequencies, in which the network controller acquires estimation information indicating a result of estimating the variations from the one or more optical receivers and acquires gain spectra of the optical amplifiers on the optical transmission path on the basis of the acquired plurality of pieces of estimation information.

An aspect of the present invention is an optical transmission method including, in an optical transmission system in which one or more optical transmitters and one or more optical receivers perform communication via an optical transmission path: by the optical transmission path, amplifying optical signals by optical amplifiers in a plurality of relay nodes and relaying the optical signals; by the one or more optical transmitters, transmitting optical signals at a plurality of channel frequencies; by the one or more optical receivers, estimating variations in intensities of the optical signals on the optical transmission path for each of the plurality of channel frequencies; and by a network controller, acquiring estimation information indicating a result of estimating the variations from the one or more optical receivers and acquiring gain spectra of the optical amplifiers in the optical transmission path on the basis of the acquired plurality of pieces of estimation information.

Advantageous Effects of Invention

According to the present invention, it is possible to monitor a relay node while curbing degradation of signal quality in an optical transmission system.

DESCRIPTION OF EMBODIMENTS

Hereinafter, embodiments of the present invention will be described with reference to drawings.

First Embodiment

Figure 1:
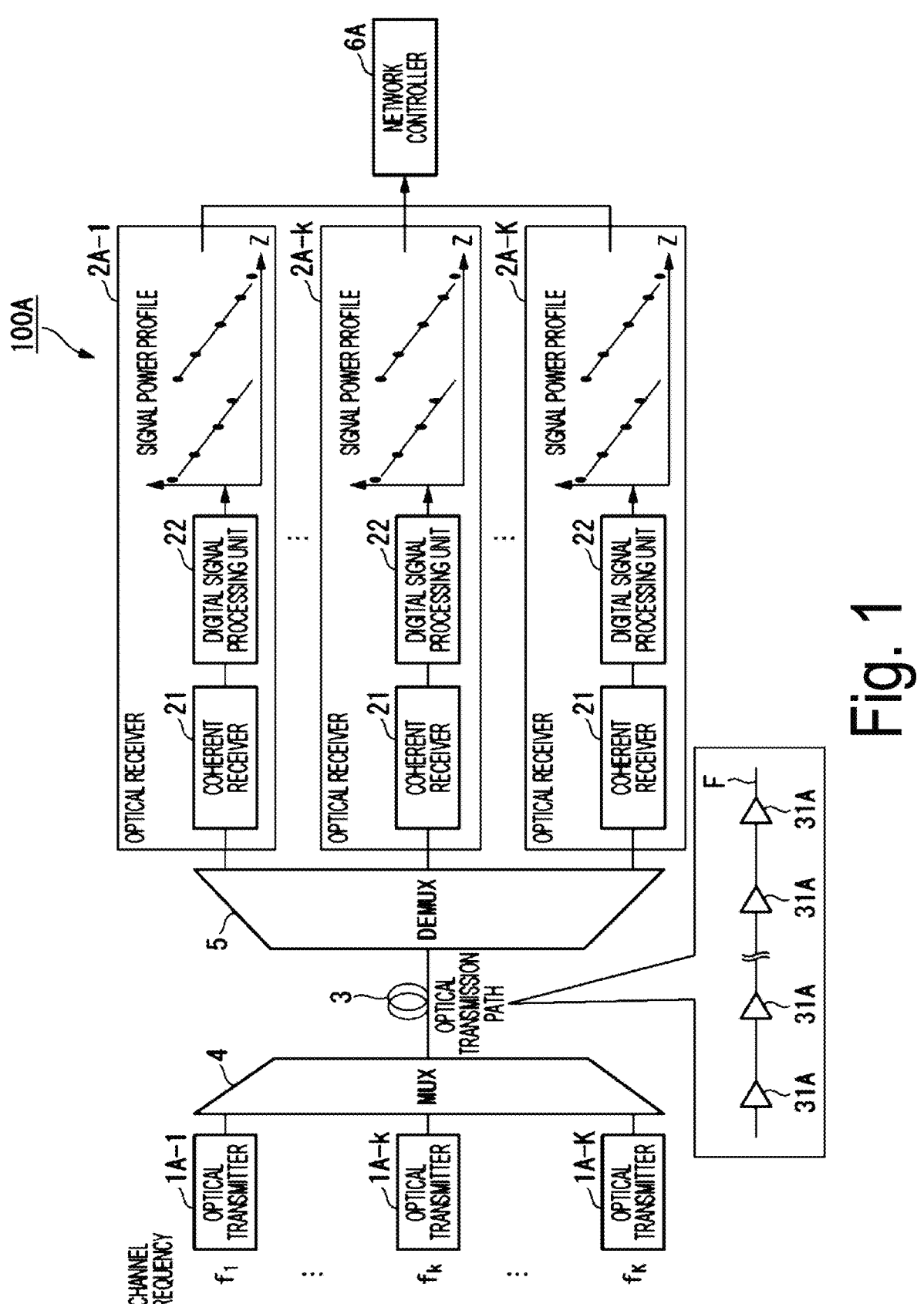
FIG. 1 is a diagram illustrating a system configuration of an optical transmission system according to a first embodiment.

FIG. 1 is a diagram illustrating a configuration example of an optical transmission system 100A according to a first embodiment. The optical transmission system 100A includes a plurality of optical transmitters 1A, a plurality of optical receivers 2A, an optical transmission path 3, a multiplexer 4, a demultiplexer 5, and a network controller 6A. The plurality of optical transmitters 1A and the plurality of optical receivers 2A are communicatively connected to each other via the optical transmission path 3. The optical transmission path 3 is configured of an optical fiber F. In the optical transmission path 3, relay nodes 31A including optical amplifiers (hereinafter, also referred to as "light amplifiers") that amplify optical signals attenuating during propagation are inserted at midpoints of the transmission path.

Specifically, the optical transmission system 100A performs communication by wavelength division multiplexing (WDM) using the plurality of optical transmitters 1A and the plurality of optical receivers 2A. Each of the plurality of optical transmitters 1A encodes transmission information given from an external information source, generates an electrical signal, converts the generated electrical signal into an optical signal, and transmits the optical signal to the optical receivers 2A via the optical transmission path 3. The plurality of optical transmitters 1A generate optical signals at mutually different channel frequencies. The multiplexer 4 multiplexes the optical signals output by the plurality of optical transmitters 1A and sends the multiplexed optical signal to the optical transmission path 3. The demultiplexer 5 demultiplexes the optical signal propagated through the optical transmission path 3 into an optical signal at each channel frequency and outputs each optical signal to the optical receiver 2A in accordance with the channel frequency.

Each of the plurality of optical receivers 2A includes a coherent receiver 21 and a digital signal processing unit 22. The coherent receiver 21 separates a baseband optical signal into two optical signals with polarization planes perpendicularly intersecting each other. These optical signals and local light from a local light emitting source (not illustrated) are input to a 90° hybrid circuit (not illustrated), and a total of four output lights, namely a pair of output lights which are caused to interfere with each other in the same phase and opposite phases and a pair of output lights which are caused to orthogonally (90°) and inverse-orthogonally (−90°) interfere with each other are obtained. Each of these output lights is converted into an analog signal by a photodiode (not illustrated). The coherent receiver 21 converts these analog signals into digital signals.

Signal waveforms are distorted when the optical signals propagate through the optical transmission path 3 due to a nonlinear optical effect that the signal phase rotates in proportion with the optical power of the signals. The digital signal processing unit 22 takes the digital signals output by the coherent receiver 21 as reception signals and performs nonlinear optical compensation on the taken reception signals.

Also, the digital signal processing unit 22 estimates a transmission property of the optical transmission path 3 on the basis of the received optical signals and notifies the network controller 6A of the estimated transmission property. Specifically, the digital signal processing unit 22 generates a signal power profile indicating an intensity distribution of the optical signals in the propagation direction as information indicating the transmission property of the optical transmission path 3. The plurality of digital signal processing units 22 supply the signal power profiles generated by each of them to the network controller 6A.

The network controller 6A collects the signal power profiles from the plurality of optical receivers 2A and acquires gain spectra of amplifiers that amplify the propagating optical signals at a plurality of observation points in the optical transmission path 3 on the basis of the collected plurality of signal power profiles. Here, the optical amplifiers include not only concentrated amplification such as an EDFA but also distribution amplifiers such as Raman amplifiers. The gain spectra are information representing a frequency property of the gains of the optical amplifiers. The optical transmission system 100A can monitor the state of the relay node 31A disposed in the optical transmission path 3 by the network controller 6A being able to acquire the gain spectra at the plurality of observation points in the optical transmission path 3.

Figure 2:
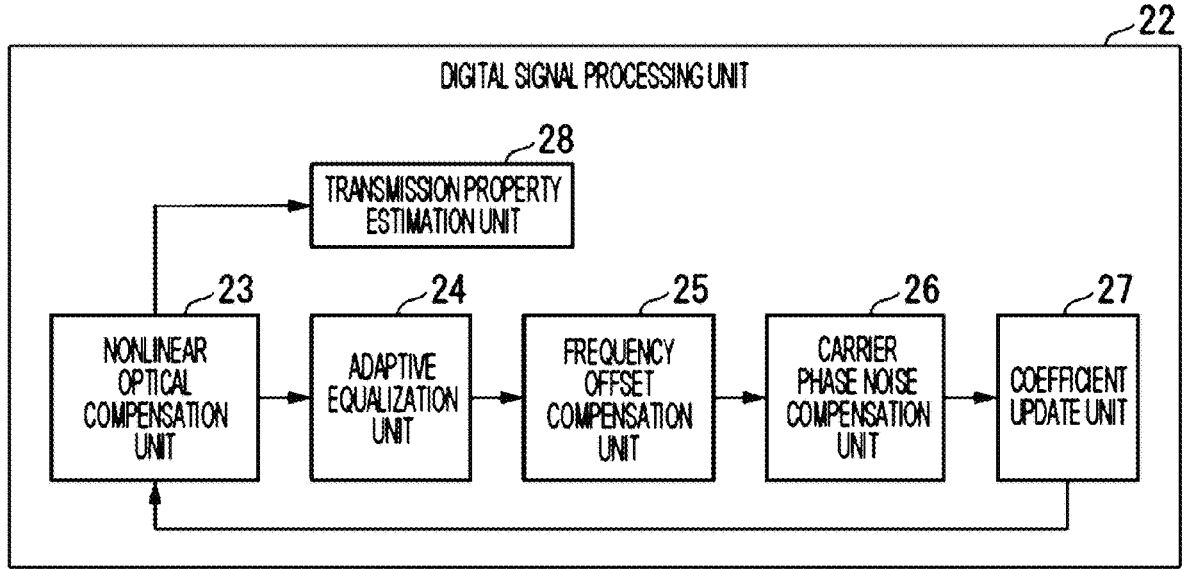
FIG. 2 is a diagram illustrating an example of a functional configuration of a digital signal processing unit.

FIG. 2 is a diagram illustrating an example of a functional configuration of the digital signal processing unit 22. The digital signal processing unit 22 includes a nonlinear optical compensation unit 23, an adaptive equalization unit 24, a frequency offset compensation unit 25, a carrier phase noise compensation unit 26, a coefficient update unit 27, and a transmission property estimation unit 28.

Figure 3:
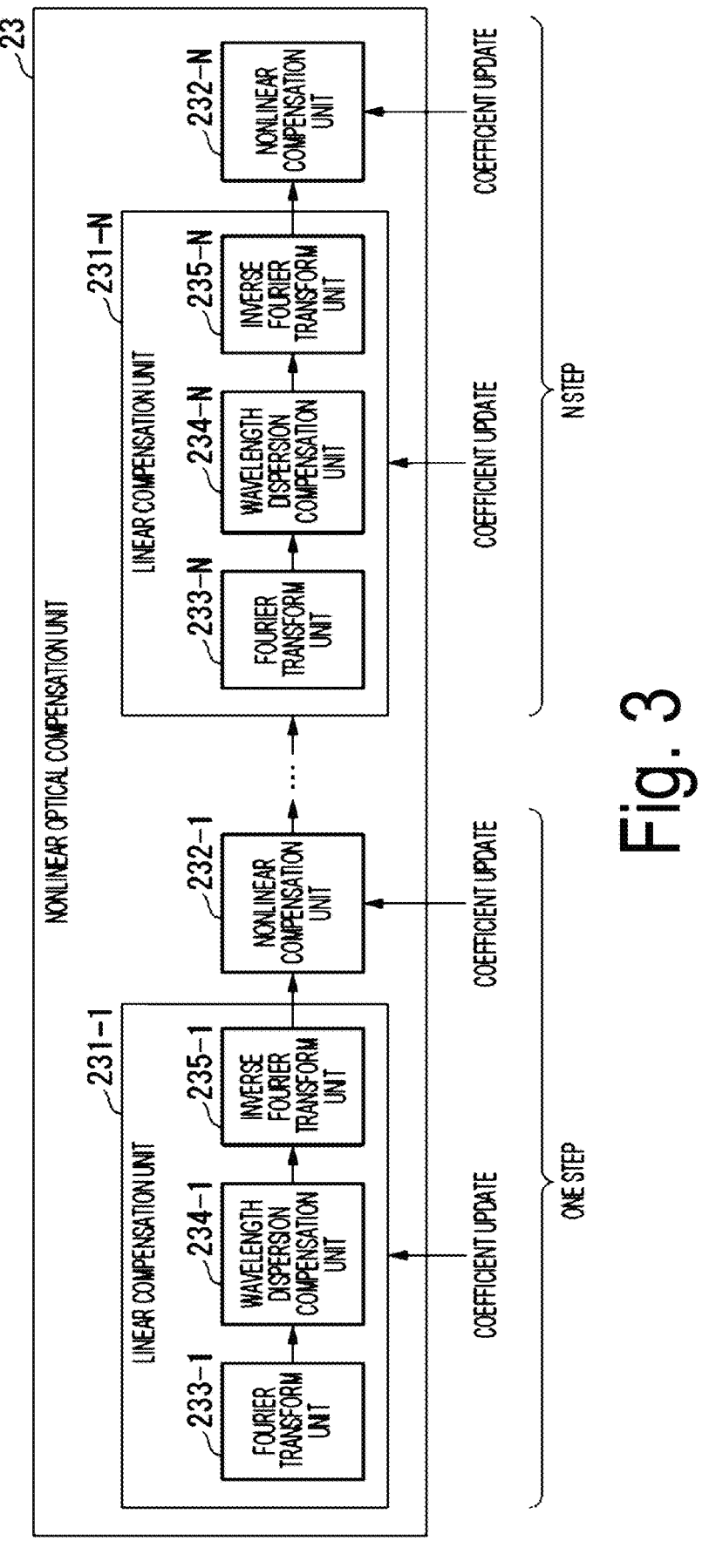
FIG. 3 is an overview block diagram showing a functional configuration of a nonlinear optical compensation unit.

FIG. 3 is an overview block diagram showing a functional configuration of the nonlinear optical compensation unit 23. The nonlinear optical compensation unit 23 includes a plurality of linear compensation units 231-1 to 231-N and a plurality of nonlinear compensation units 232-1 to 232-N. One linear compensation unit 231 and one nonlinear compensation unit 232 form one set performing linear compensation and nonlinear compensation, and the nonlinear optical compensation unit 23 includes N sets to perform N steps of processing performed by the sets.

The linear compensation unit 231-1 includes a Fourier transform unit 233-1, a wavelength dispersion compensation unit 234-1, and an inverse Fourier transform unit 235-1. The Fourier transform unit 233-1 converts a time domain reception signal into a frequency domain reception signal by performing FFT on the time domain reception signal.

The wavelength dispersion compensation unit 234-1 performs wavelength dispersion compensation by multiplying the frequency domain reception signal by a predetermined value (for example, $\exp\hat{}(-j\beta_k\omega^2)$). Note that the symbol "^" means that the value after "^" is a superscript of exp. For example, $\exp\hat{}(-j\beta_k\omega^2)$ means that $(-j\beta_k\omega^2)$ is a superscript of exp. In regard to "^", the same applies to the following description. The wavelength dispersion compensation unit 234-1 performs wavelength dispersion compensation by using a dispersion coefficient $\beta_k$ set as an initial value at the time of the start of the processing and performs wavelength dispersion compensation by using the updated dispersion coefficient $\beta_k$ every time the coefficient update unit 27 updates the dispersion coefficient $\beta_k$.

The inverse Fourier transform unit 235-1 converts the reception signal after the wavelength dispersion compensation into a time domain reception signal by performing IFFT on the signal output from the wavelength dispersion compensation unit 234-1.

The nonlinear optical compensation unit 23 compensates for the nonlinear optical effect by multiplying the signal sequence output from the inverse Fourier transform unit 235 by a predetermined value (for example, $\exp\hat{}(-j\phi_k)$). Specifically, the nonlinear optical compensation unit 23 compensates for the nonlinear optical effect by using the phase rotation amount $\phi_k$ set as an initial value at the time of the start of the processing and compensates for the nonlinear optical effect by using the updated phase rotation amount $\phi_k$ every time the coefficient update unit 27 updates the phase rotation amount $\phi_k$.

The linear compensation unit 231-N performs processing similar to that of the linear compensation unit 231-1. Also, the nonlinear compensation unit 232-N performs processing similar to that of the nonlinear compensation unit 232-1.

Returning to FIG. 2, description of the optical receiver 2A will be continued. The adaptive equalization unit 24 is a functional unit that compensates for distortion occurring in the waveform of an optical signal in the optical transmission path 3. In other words, the adaptive equalization unit 24 is a functional unit that corrects a code error occurring in an optical signal due to interference between codes (interference between symbols) in the optical transmission path 3. The adaptive equalization unit 24 executes adaptive equalization processing by an FIR filter (finite impulse response filter) in accordance with a set tap coefficient.

The frequency offset compensation unit 25 executes processing of compensating for a frequency offset on the four digital signals on which the adaptive equalization processing has been executed.

The carrier phase noise compensation unit 26 executes processing of compensating for a phase offset on the four digital signals, the frequency offsets of which have been compensated for.

The coefficient update unit 27 updates all the coefficients (for example, the dispersion coefficient $\beta_k$, the phase rotation amount $\phi_k$, and the like) used by the nonlinear optical compensation unit 23 in all the steps. In the first embodiment, the coefficient update unit 27 updates all the coefficients (for example, the dispersion coefficient $\beta_k$, the phase rotation amount $\phi_k$, and the like) used by the nonlinear optical compensation unit 23 on the basis of the output signals output from the carrier phase noise compensation unit 26 and a training signal in all the steps. The coefficient update unit 27 sets the updated coefficients for each functional unit in the nonlinear optical compensation unit 23. The training signal compared with the output signals in the first embodiment is a transmission signal converted into an electrical signal.

The transmission property estimation unit 28 estimates a transmission property of the optical transmission path 3. For example, the transmission property estimation unit 28 estimates loss distribution by using the optimized phase rotation amount $\phi_k$. Also, the transmission property estimation unit 28 estimates distribution dispersion by using the optimized dispersion coefficient $\beta_k$. The transmission property estimation unit 28 supplies information indicating the estimated loss distribution and the dispersion distribution as a signal power profile to the network controller 6A.

Figure 4:
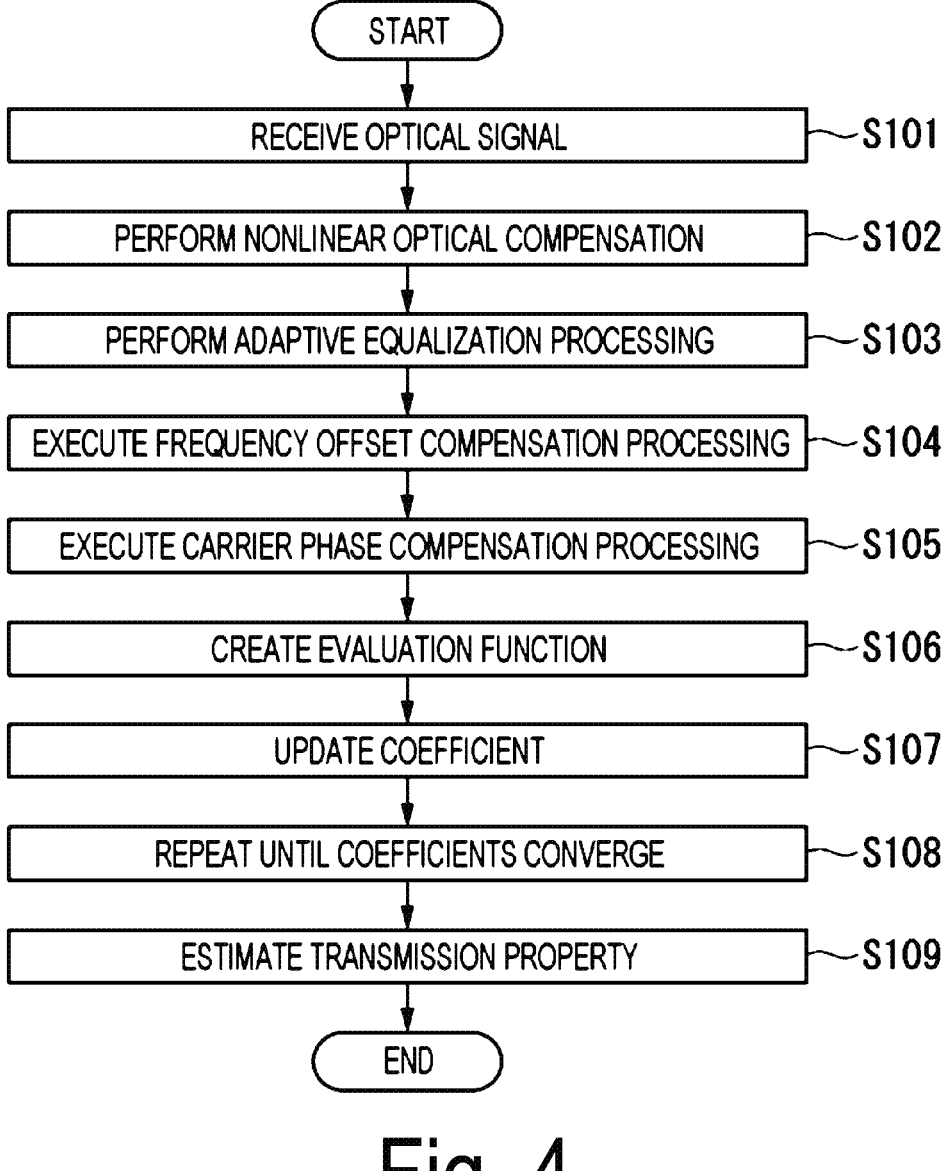
FIG. 4 is a flowchart illustrating a flow of transmission property estimation processing performed by an optical receiver.

FIG. 4 is a flowchart illustrating a flow of transmission property estimation processing performed by the optical receiver 2A in the first embodiment. First, initial setting before the processing in FIG. 4 is started will be described. Compensation coefficients used by functional units included in the digital signal processing unit 22 other than the nonlinear optical compensation unit 23, for example, the adaptive equalization unit 24, the frequency offset compensation unit 25, and the carrier phase noise compensation unit 26 are estimated in advance, and the estimated compensation coefficients are set. Note that a conventional method may be used as the estimation method. Next, appropriate initial values are set as all the coefficients (for example, the dispersion coefficient $\beta_k$, the phase rotation amount $\phi_k$, and the like) used by the nonlinear optical compensation unit 23. Note that initial values of all the coefficients used by the nonlinear optical compensation unit 23 are arbitrary values. For example, the initial values may be zero, or a value of the phase rotation amount $\phi_k$ (dispersion coefficient $\beta_k$) that is known, such as an input power, may be used as it is. The initial setting is performed as described hitherto.

Once the initial setting is completed, the coherent receiver 21 of the optical receiver 2A receives an optical signal transmitted from the optical transmitter 1A (Step S101). The coherent receiver 21 converts the received optical signal into a digital signal and outputs the digital signal to the digital signal processing unit 22. The nonlinear optical compensation unit 23 performs nonlinear optical compensation on each digital signal output from the coherent receiver 21 (Step S102). Specifically, the Fourier transform unit 233-1 converts a time domain reception signal into a frequency domain reception signal by performing FFT on the time domain reception signal. The Fourier transform unit 233-1 outputs the reception signal converted into the frequency domain to the wavelength dispersion compensation unit 234-1.

The wavelength dispersion compensation unit 234-1 performs wavelength dispersion compensation on the frequency domain reception signal. At this time, the wavelength dispersion compensation unit 234-1 uses the dispersion coefficient $\beta_k$ set as an initial value. The wavelength dispersion compensation unit 234-1 outputs the reception signal after the wavelength dispersion compensation to the inverse Fourier transform unit 235-1. The inverse Fourier transform unit 235-1 converts the reception signal after the wavelength dispersion compensation into a time domain reception signal by performing IFFT on the signal output from the wavelength dispersion compensation unit 234-1. The inverse Fourier transform unit 235-1 outputs the reception signal converted into the time domain to the nonlinear compensation unit 232-1. The nonlinear compensation unit 232-1 compensates for the nonlinear optical effect on the reception signal converted into the time domain. At this time, the nonlinear compensation unit 232-1 uses the phase rotation amount $\phi_k$ set as an initial value. The nonlinear compensation unit 232-1 outputs the reception signal, for which the nonlinear optical effect has been compensated, to the Fourier transform unit 233 in the later stage.

Once the processing in Step 102 above is executed to correspond to N steps, the adaptive equalization unit 24 performs adaptive equalization processing of compensating for distortion occurring in waveforms of the output signals output from the nonlinear optical compensation unit 23 (Step S103). Note that since the method for the adaptive equalization processing is the same as that in the related art, description thereof will be omitted. The adaptive equalization unit 24 outputs the signal after the adaptive equalization processing to the frequency offset compensation unit 25.

The frequency offset compensation unit 25 executes frequency offset compensation processing of compensating for the frequency offset on the signal output from the adaptive equalization unit 24 (Step S104). Note that since the method for the frequency offset compensation processing is the same as that in the related art, description thereof will be omitted. The frequency offset compensation unit 25 outputs the signal after the frequency offset compensation processing to the carrier phase noise compensation unit 26.

The carrier phase noise compensation unit 26 executes carrier phase noise compensation processing of compensating for the phase offset on the digital signal, the frequency offset of which has been compensated for (Step S105). Note that since the method for the carrier phase compensation processing is the same as that in the related art, description thereof will be omitted. The carrier phase noise compensation unit 26 outputs the signal after the carrier phase noise compensation processing to the coefficient update unit 27.

The coefficient update unit 27 compares the output signal output from the carrier phase noise compensation unit 26 with the training signal acquired in advance and creates a predetermined evaluation function (Step S106). Any evaluation function may be used as the evaluation function. For example, a residual sum of squares represented by Equation (1) below or an equation obtained by adding a regularization term to the residual sum of squares as represented by Equation (2) below may be used as the evaluation function.

[Math. 1]

$$J = \frac{1}{2} \sum_i |x_i - t_i|^2 \tag{1}$$

[Math. 2]

$$J = \frac{1}{2} \sum_i |x_i - t_i|^2 + \lambda \sum_k \log(\varphi_k - \varphi_{k+1}) \tag{2}$$

In Equation (1), J represents an evaluation function, $x_i$ represents a reception signal of an i-th (i is an integer that is equal to or greater than 1) sample, and $t_i$ represents a correct answer signal of the i-th sample. Additionally, the second term in the right side of Equation (2) is a regularization term. $\phi_k$ in the regularization term represents a nonlinear phase rotation amount of the k-th step. It is possible to enhance estimation accuracy of loss (estimated) distribution by adding the regularization term. Note that the regularization term may be any function as long as it is possible to enhance estimation accuracy of loss distribution.

Next, the coefficient update unit 27 updates all the coefficients (for example, the dispersion coefficient $\beta_k$, the phase rotation amount $\phi_k$, and the like) used by the nonlinear optical compensation unit 23 by using an optimization algorithm to minimize the created evaluation function (Step S107). As the optimization algorithm, a method of optimizing the dispersion coefficient $\beta_k$, and the phase rotation amount $\phi_k$ one by one or a known method that is present in the field of machine learning, such as an error back propagation method or a steepest descent method may be used.

In a case where the method of optimizing the dispersion coefficient $\beta_k$, and the phase rotation amount $\phi_k$ one by one is used, the coefficient update unit 27 performs processing represented in (1) to (3) below.

(1) Optimizing $\phi_1$ such that the evaluation function is minimized (other $\phi_k$ is fixed)

(2) Optimizing $\phi_2$ to $\phi_N$ one by one in a similar manner (3) Performing optimization from $\phi_2$ again and repeating the processing until all the coefficients from $\phi_1$ to $\phi_N$ converge Note that the order of ok to be optimized may be an arbitrary order. Also, the processing represented in (1) to (3) above is executed for the phase rotation amount $\phi_k$ as well.

In a case where the steepest descent method is used, the coefficient update unit 27 updates all the coefficients (for example, the dispersion coefficient $\beta_k$, the phase rotation amount $\phi_k$, and the like) used by the nonlinear optical compensation unit 23 on the basis of Equation (3) below. Since the coefficient update unit 27 can execute the update of all the dispersion coefficients $\beta_k$ and the phase rotation amounts $\phi_k$ at the same time by using the steepest descent method, it is possible to shorten the estimation time. Further, there is a likelihood that the estimation accuracy is improved.

[Math. 3]

$$\varphi_k(t+1) = \varphi_k(t) - \mu \frac{\partial J}{\partial \varphi_k} \tag{3}$$

$$\beta_k(t+1) = \beta_k(t) - \mu \frac{\partial J}{\partial \beta_k}$$

In Equation (3), $\mu$ represents a step size. As in Equation (3), differentiation by $\beta_k$ and $\phi_k$ of the evaluation function J is required. Although various methods for obtaining this differentiation are assumed, any method may be used. For example, the differentiation is calculated by using an error back propagation method (see Reference Literature 1, for example), a numerical differentiation, or the like that are often used in the field of machine learning.

(Reference Literature 1: R. P. Lippmann., "An introduction to computing with neural nets," IEEE ASSP Mag., 4 (2) 1987.)

The coefficient update unit 27 sets the coefficients after the update in the nonlinear optical compensation unit 23. Thereafter, the optical receiver 2A repeatedly executes the processing in Step S102 to S107 until the coefficients converge, by using the newly set coefficients (Step S108).

Figure 5:
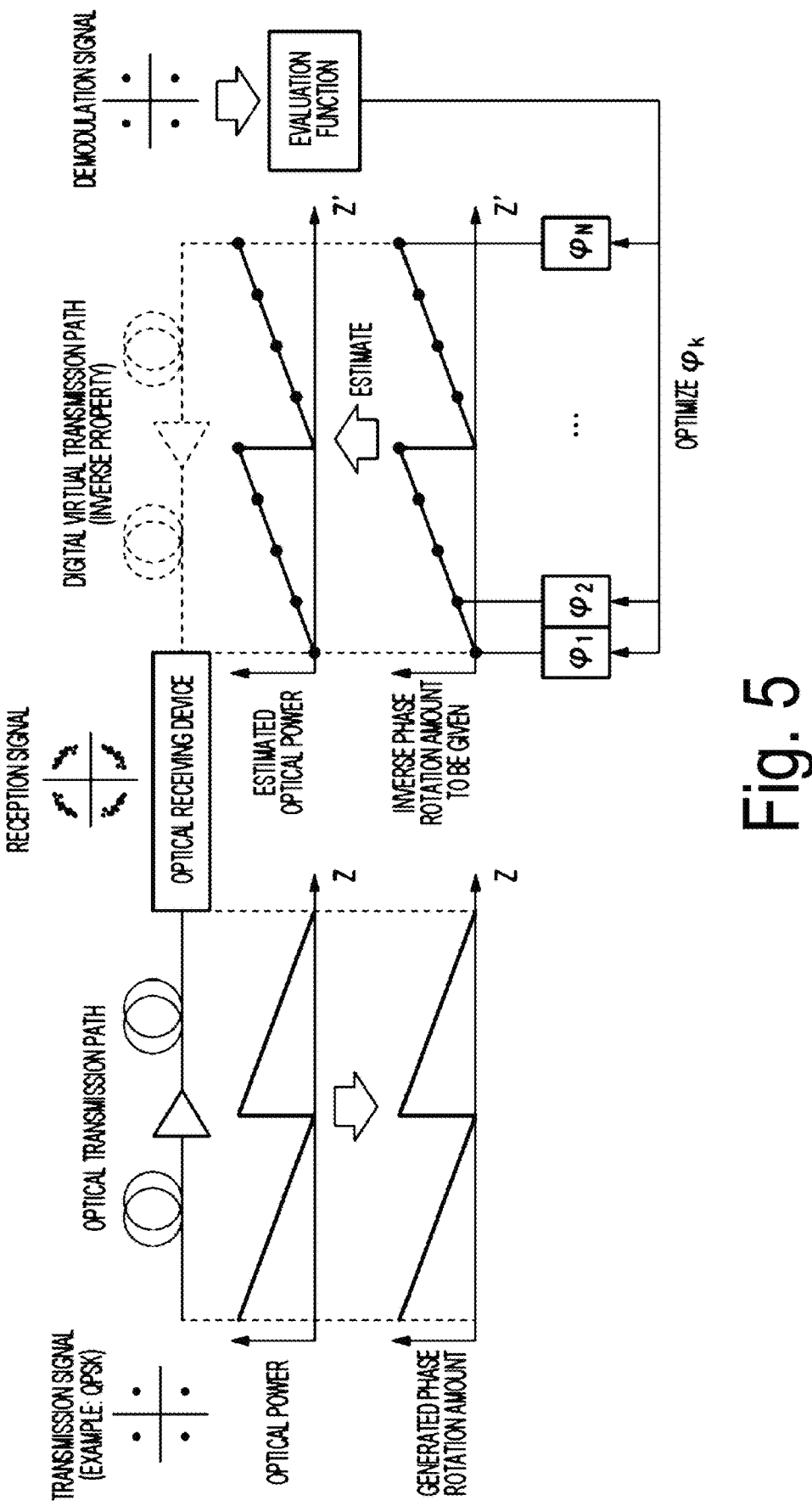
FIG. 5 is a diagram for explaining a method for realizing loss distribution estimation.
Figure 6:
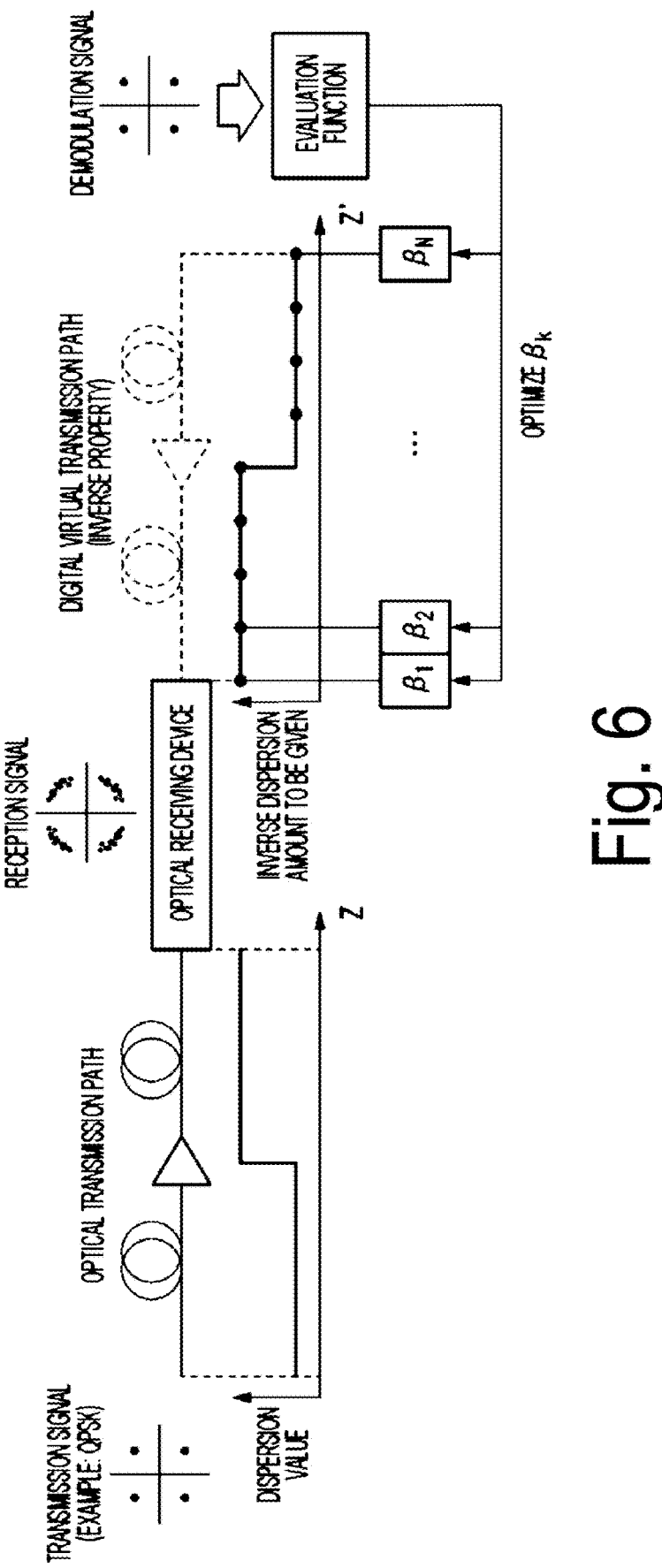
FIG. 6 is a diagram for explaining a method for realizing dispersion distribution estimation.

The transmission property estimation unit 28 acquires all the optimized coefficients (for example, the dispersion coefficient $\beta_k$, the phase rotation amount $\phi_k$, and the like). For example, the transmission property estimation unit 28 may acquire all the optimized coefficients (for example, the dispersion coefficient $\beta_k$, the phase rotation amount $\phi_k$, and the like) from the nonlinear optical compensation unit 23 or may acquire them directly from the coefficient update unit 27. The transmission property estimation unit 28 uses the all the acquired optimized coefficients (for example, the dispersion coefficient $\beta_k$, the phase rotation amount $\phi_k$, and the like) to estimate the transmission property (Step S109). Specifically, the transmission property estimation unit 28 estimates loss distribution by plotting all the optimized phase rotation amounts $\phi_k$ ($\phi_1$ to $\phi_N$) as illustrated in FIG. 5. Also, the transmission property estimation unit 28 estimates dispersion distribution by plotting all the optimized dispersion coefficients $\beta_k$ ($\beta_1$ to $\beta_N$) as illustrated in FIG. 6. Note that the horizontal axis Z represents a distance in FIGS. 5 and 6. The transmission property estimation unit 28 supplies the signal power profile indicating the estimation result (the loss distribution and the dispersion distribution) to the network controller 6A.

Note that the method for generating a signal power profile described above is an example, and the method is not limited to the method described above. The signal power profile may be generated by any other similar methods as long as the signal power profile is generated through digital signal processing in the methods (see Patent Literature 1, Non Patent Literature 1, 2, and 3, for example).

Figure 7:
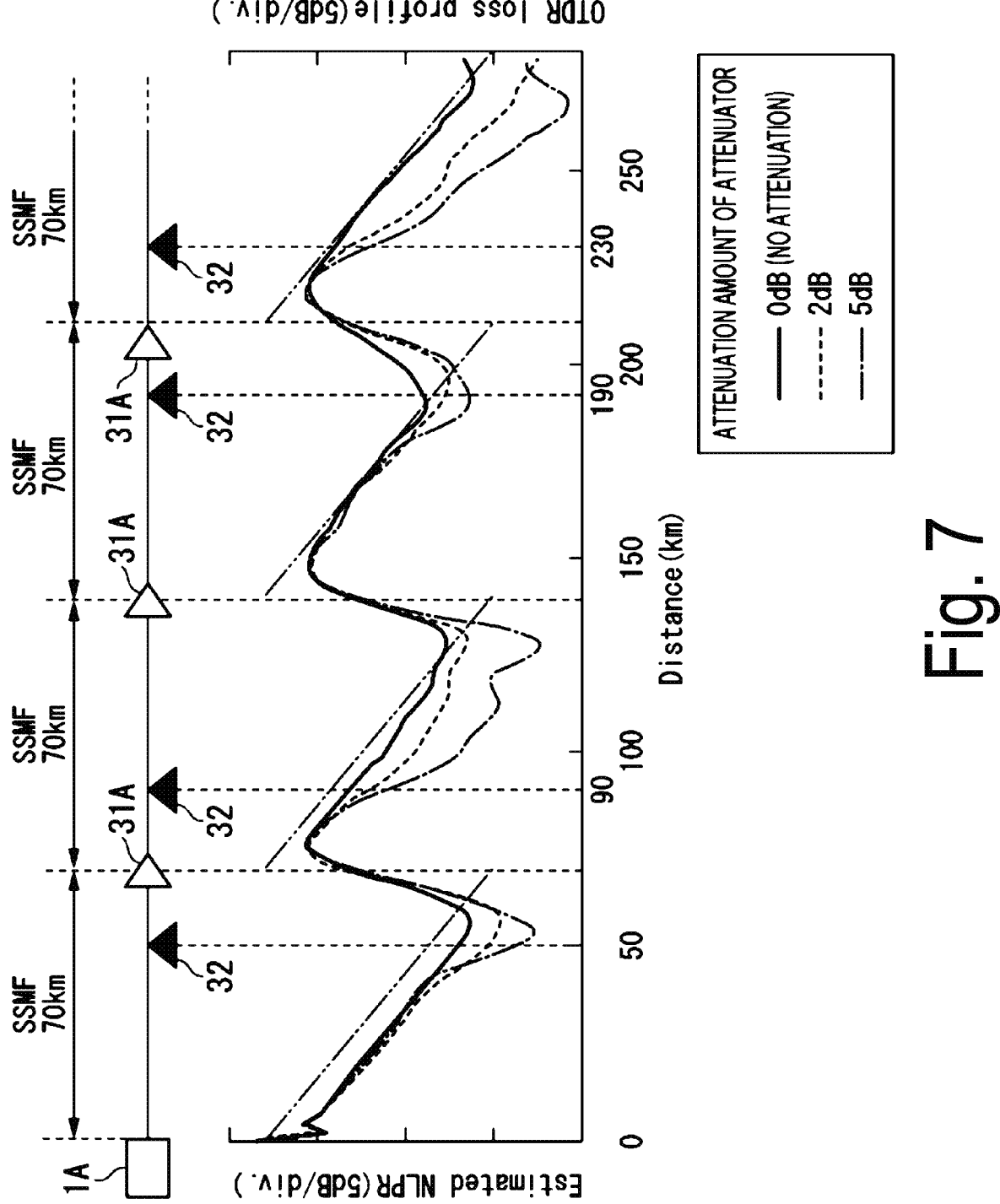
FIG. 7 is a diagram illustrating a specific example of a signal power profile.

FIG. 7 is a diagram illustrating a specific example of the signal power profile. In FIG. 7, the horizontal axis represents a transmission distance from the optical transmitter 1A, and the vertical axis represents an estimated value of a non-linear phase rotation (NLPR) amount. Also, the optical transmission path 3 at the upper portion of the graph is illustrated in a disposition example of the relay node 31A (light amplifier) and the attenuator 32 in the optical transmission path 3 corresponding to the transmission distance of the horizontal axis. Here, the attenuator 32 is intentionally disposed at a midpoint of the transmission path in order to see whether or not it is possible to detect intentional attenuation of the optical signal. Here, a transmission path of 70 km×4 spans of a standard single-mode fiber (SSMF) is assumed as the optical transmission path 3. The solid line of the graph represents an estimated value of NLPR in different attenuation levels, and the dashed line represents a signal power profile (normal time) for reference obtained through OTDR.

As illustrated in FIG. 7, it is possible to ascertain that the amplification of the optical signal by the light amplifier and the attenuation of the optical signal by the optical fiber and the attenuator 32 can be accurately detected by the signal power profile generated through the aforementioned digital signal processing. More specifically, it is possible to ascertain that the start of the peak corresponds to the position of the optical amplifier 31A. The network controller 6A collects signal power profiles acquired in this manner from the plurality of optical receivers 2A at different channel frequencies and estimates the gain spectrum of the optical transmission path 3 on the basis of the collected plurality of signal power profiles.

More specifically, the network controller 6A estimates the position of each relay node 31A (light amplifier) from the signal power profile of each optical receiver 2A, and plots the estimated value (that is, the gain) of the optical signal intensity at the position of each relay node 31A in the frequency direction.

Figures 8, 9:
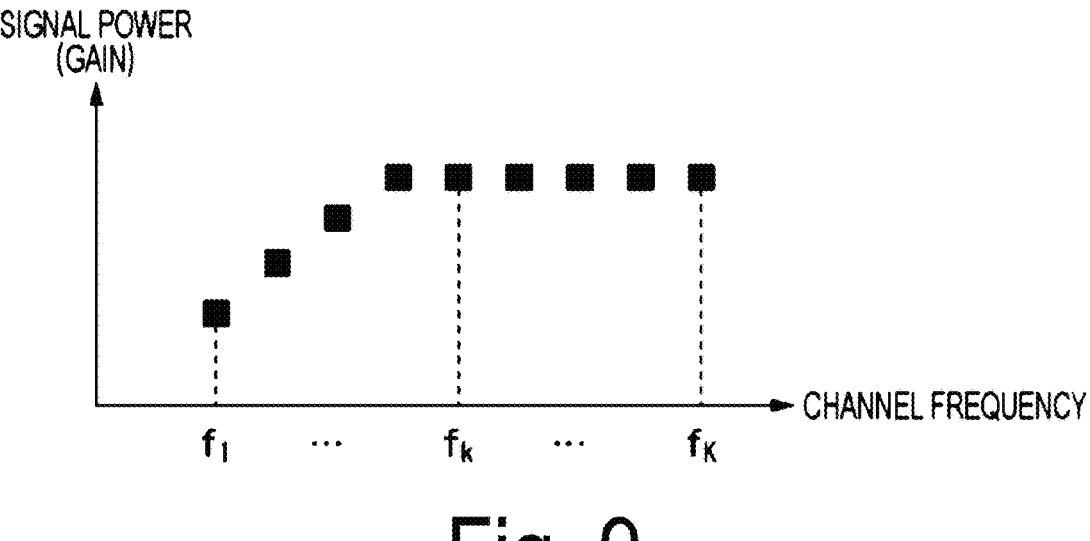
FIG. 8 is a diagram illustrating a state where signal power profiles of each optical receiver are aligned in an order of frequency channels.
FIG. 9 is a diagram in which signal power estimated value groups extracted from the signal power profiles of each optical receiver are plotted to correspond to the channel frequencies of the optical receivers for a target node.

FIG. 8 is a diagram illustrating a state where the signal power profiles of the optical receivers 2A are aligned in the order of the frequency channels. In a case where a relay node 31A (light amplifier) is set as a target, for example, the network controller 6A extracts an estimated value group V1 corresponding to the position of the target relay node 31A (hereinafter, referred to as a "target node") from each signal power profile.

FIG. 9 is a diagram in which the estimated value groups of the signal power extracted from the signal power profiles of the optical receivers 2A are plotted to correspond to the channel frequencies ($f_1$, $f_2$, . . . , $f_k$, . . . $f_K$) of the K optical receivers 2A for the target node 31A. Hereinafter, information indicating a relationship between the thus acquired signal power and the channel frequency will be referred to as a "gain spectrum". The network controller 6A can acquire gain spectra for all the relay nodes 31A disposed in the optical transmission path 3 by extracting and plotting the estimated value groups by setting all the relay nodes 31A disposed in the optical transmission path 3 as target nodes.

Figure 10:
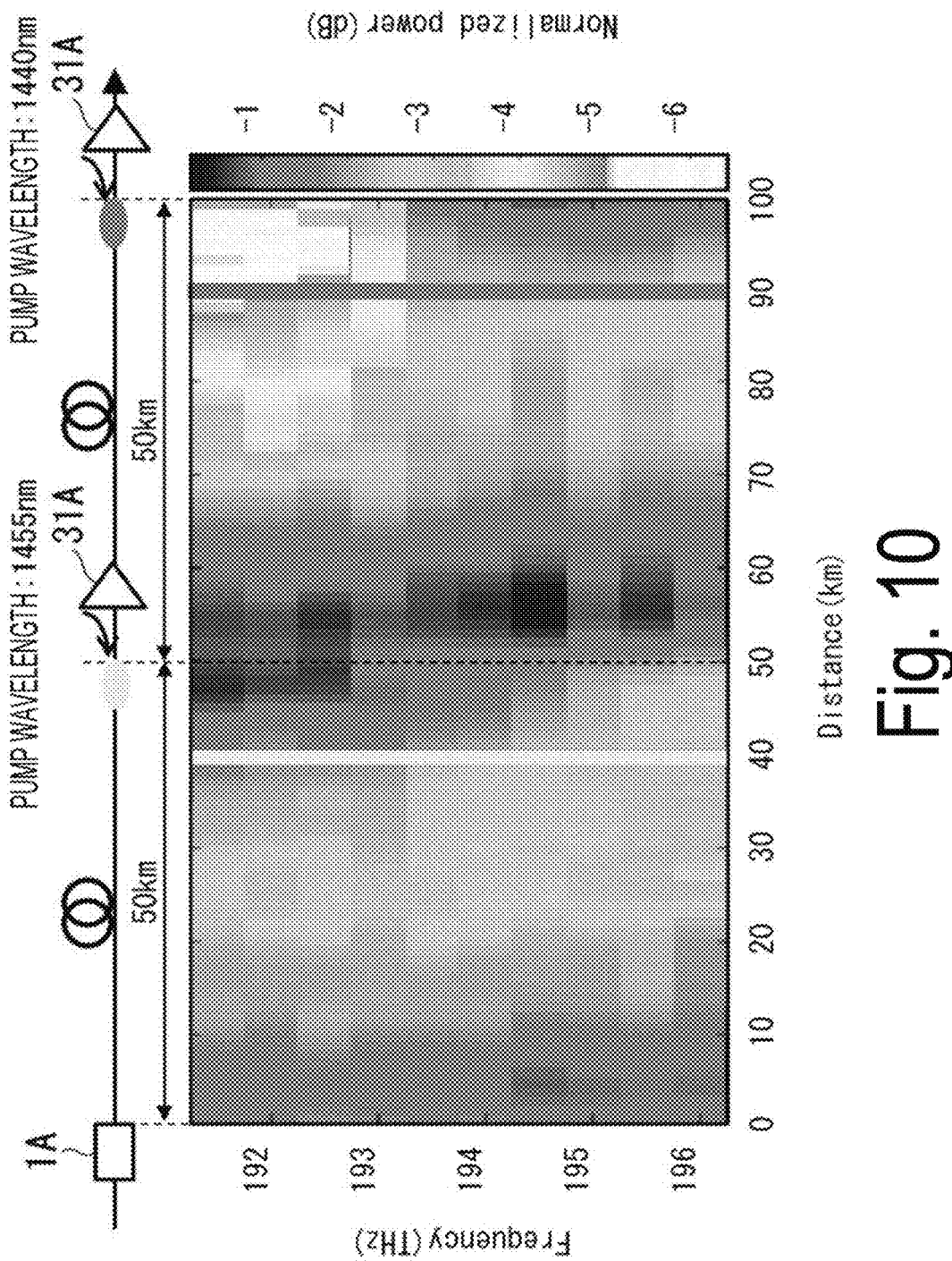
FIG. 10 is a diagram illustrating an example effect achieved by the optical transmission system according to the first embodiment.
Figure 11:
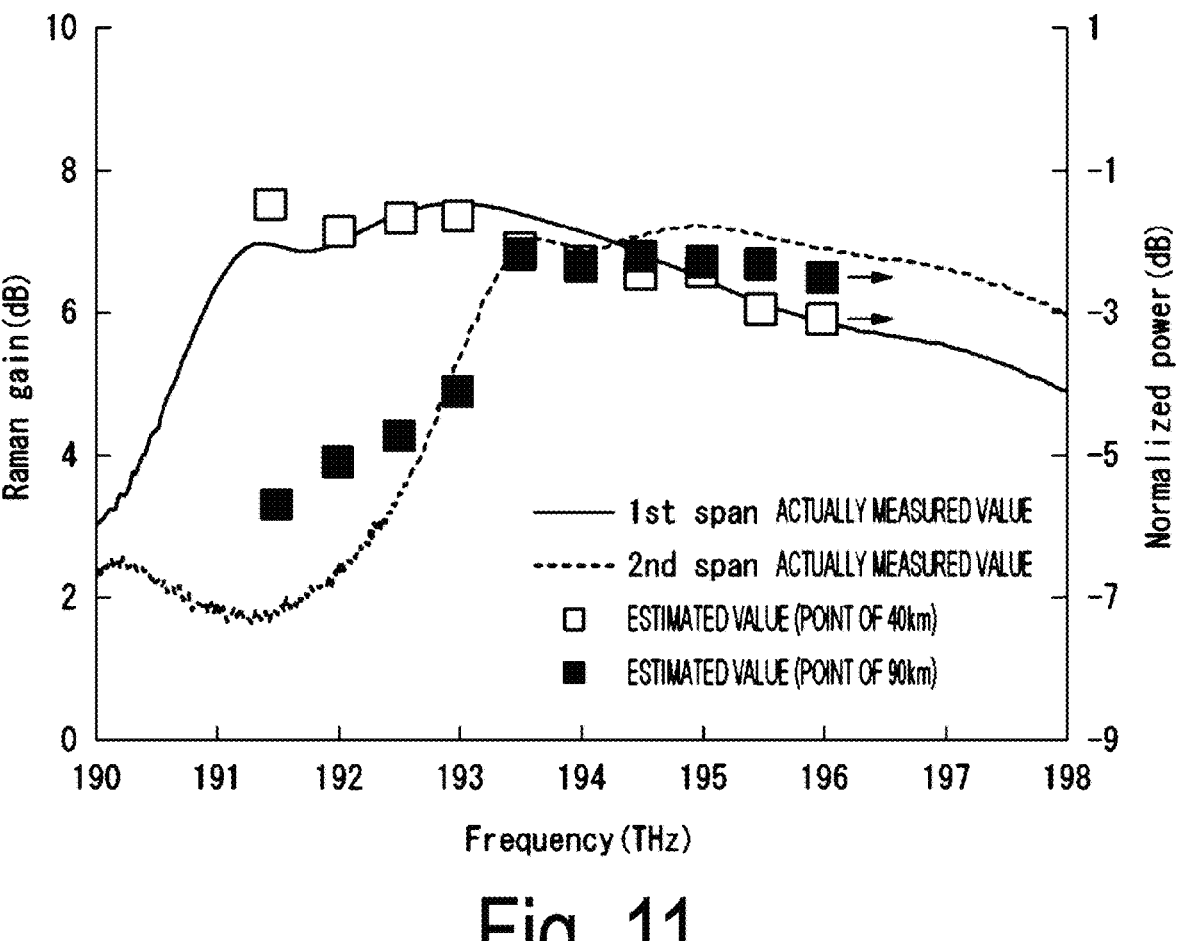
FIG. 11 is a diagram illustrating an example effect achieved by the optical transmission system according to the first embodiment.

FIGS. 10 and 11 are diagrams illustrating an example of effect achieved by the optical transmission system 100A according to the embodiment. Specifically, FIGS. 10 and 11 illustrate a result of performing an experiment of acquiring signal power profiles and gain spectra for the first span and the second span of the optical transmission system 100A, in which the distance of the optical transmission path 3 per span is 50 km, by the method according to the present embodiment. In this experiment, Raman amplifiers that perform distribution Raman amplification based on backward excitation are used for the relay nodes 31A-1 and 31A-2.

Also, in this experiment, mutually different gain spectra are set in regard to output gains of excitation light for the relay nodes 31A-1 and 31A-2 for comparison. Specifically, the relay node 31A-1 is set such that excitation light with a wavelength of 1455 nm is output, and the relay node 31A-2 is set such that excitation light with a wavelength of 1440 nm that is shorter than that for the relay node 31A-1 is output. In this manner, the relay node 31A-1 and the relay node 31A-2 exhibit different gain spectra. FIG. 10 represents a signal power profile at each channel frequency observed under such conditions in one graph.

FIG. 11 indicates a result of estimating gain spectra at a point of 40 km and a point of 90 km, for example, on the basis of the signal power profiles estimated as in FIG. 10. In FIG. 11, the curved line represents a gain spectrum of the Raman amplifier measured by OSA for reference, and the dot group represents a gain spectrum estimated by the transmission property estimation unit 28 It is possible to ascertain from the estimation result in FIG. 11 that the result of estimating the gain spectrum by the network controller 6A substantially coincides with the values actually measured by the OSA.

The optical transmission system 100A configured as described above includes the plurality of optical transmitters 1A that transmit optical signals at different channel frequencies, the plurality of optical receivers 2A that generate the signal power profiles at each channel frequency through digital signal processing of the optical signals received from the optical transmitters 1A, and the network controller 6A that collects the signal power profiles of the optical signals at the different channel frequencies from the plurality of optical receivers 2A and acquires gain spectra of the optical amplifiers at the relay nodes 31A on the basis of the collected signal power profiles.

According to such a configuration, the optical transmission system 100A can monitor the relay nodes while curbing degradation of signal quality since there is no need to branch the optical signals from the optical transmission path 3 and measure them. Also, according to such a configuration, a measurement gauge such as an OSA and an OCM for branching the optical signals from the optical transmission path 3 and measuring them is not needed, and it is thus possible to monitor the relay nodes while curbing an increase in cost. Also, according to such a configuration, it is possible to monitor the relay nodes through the digital signal processing of the optical signals and thereby to automatically monitor the relay nodes from a remote location. Moreover, according to such a configuration, it is possible to collectively monitor the individual properties of the plurality of relay nodes 31A (optical amplifiers) in the optical transmission system 100A. Furthermore, according to such a configuration, it is possible to monitor the properties of the relay nodes 31A even during an operation through the digital signal processing of the optical signals arbitrarily transmitted and received.

Second Embodiment

Figure 12:
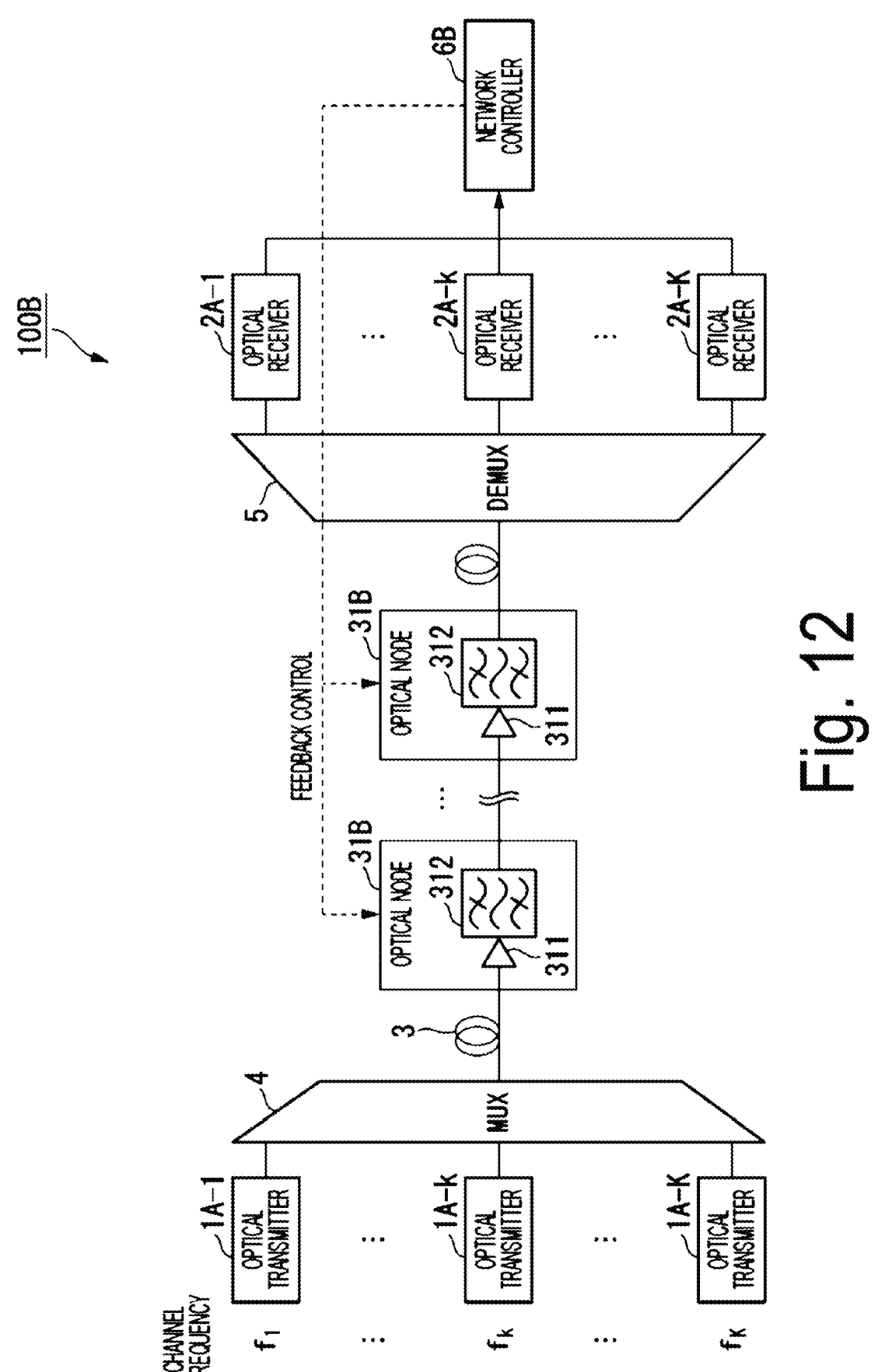
FIG. 12 is a diagram illustrating a configuration example of an optical transmission system according to a second embodiment.

FIG. 12 is a diagram illustrating a configuration example of an optical transmission system 100B according to a second embodiment. The optical transmission system 100B is different from the optical transmission system 100A according to the first embodiment in that a network controller 6B is included instead of the network controller 6A and a relay nodes 31B are included instead of the relay nodes 31A. The other configurations of the optical transmission system 100B are similar to those of the optical transmission system 100A. The same reference signs as those in FIG. 1 are applied to functional units that are similar to those in the first embodiment in FIG. 12, and description thereof will be omitted.

The network controller 6B has a function of performing feedback control on a relay node 31B at each corresponding position on the basis of each acquired gain spectrum, in addition to the function of acquiring the gain spectrum at the position of each relay node 31B that is similar to that of the network controller 6A. Here, the network controller 6 is assumed to be communicatively connected to each relay node 31B via a control communication network, which is not illustrated.

The relay node 31B includes an optical amplifier 311 (light amplifier) and an optical filter 312. The light amplifier 311 is similar to the light amplifier included in the relay node 31A. The optical filter 312 is adapted such that optical signals are input thereto and the optical filter 312 outputs optical signals satisfying a predetermined condition from among the input optical signals.

Specifically, the network controller 6B performs feedback control for compensating for a gain tilt of each relay node

31B while monitoring the gain spectrum corresponding to each position of the relay node 31B. For example, the network controller 6 controls a pump wavelength or a pump power of the light amplifier 311 such that the gain spectrum of each relay node 31B has a desired shape. For example, the network controller 6 may be configured to control the pump wavelength or the pump power of each light amplifier 311 such that the gain spectrum obtained as an estimation result is close to the gain spectrum set in advance.

Also, in a case that the optical filter 312 includes a wavelength selecting function such as a wavelength selective switch (WSS), the network controller 6 may be configured to control the optical filter 312 such that the output light is a frequency-flat WDM signal by causing the inverse function of the obtained gain spectrum to act on the output gain of the optical filter 312.

In the optical transmission system 100B configured as described above, the network controller 6B controls each relay node 31B through feedback control based on the gain spectrum of the optical amplifier acquired for each relay node 31B. With such a configuration, the optical transmission system 100B according to the second embodiment can monitor the relay nodes while curbing degradation of signal quality and adjust the output of each relay node 31B on the basis of the observed gain spectrum.

Modification Examples Common to First Embodiment and Second Embodiment

Hereinafter, modification examples common to the first embodiment and the second embodiment will be described. The following description will be given with alphabets of the reference signs omitted in a case where the components are not particularly distinguished. For example, in a case where the optical transmission system 100A according to the first embodiment and the optical transmission system 100B according to the second embodiment are not particularly distinguished, both will be collectively referred to as an "optical transmission system 100".

First Modification Example

Figure 13:
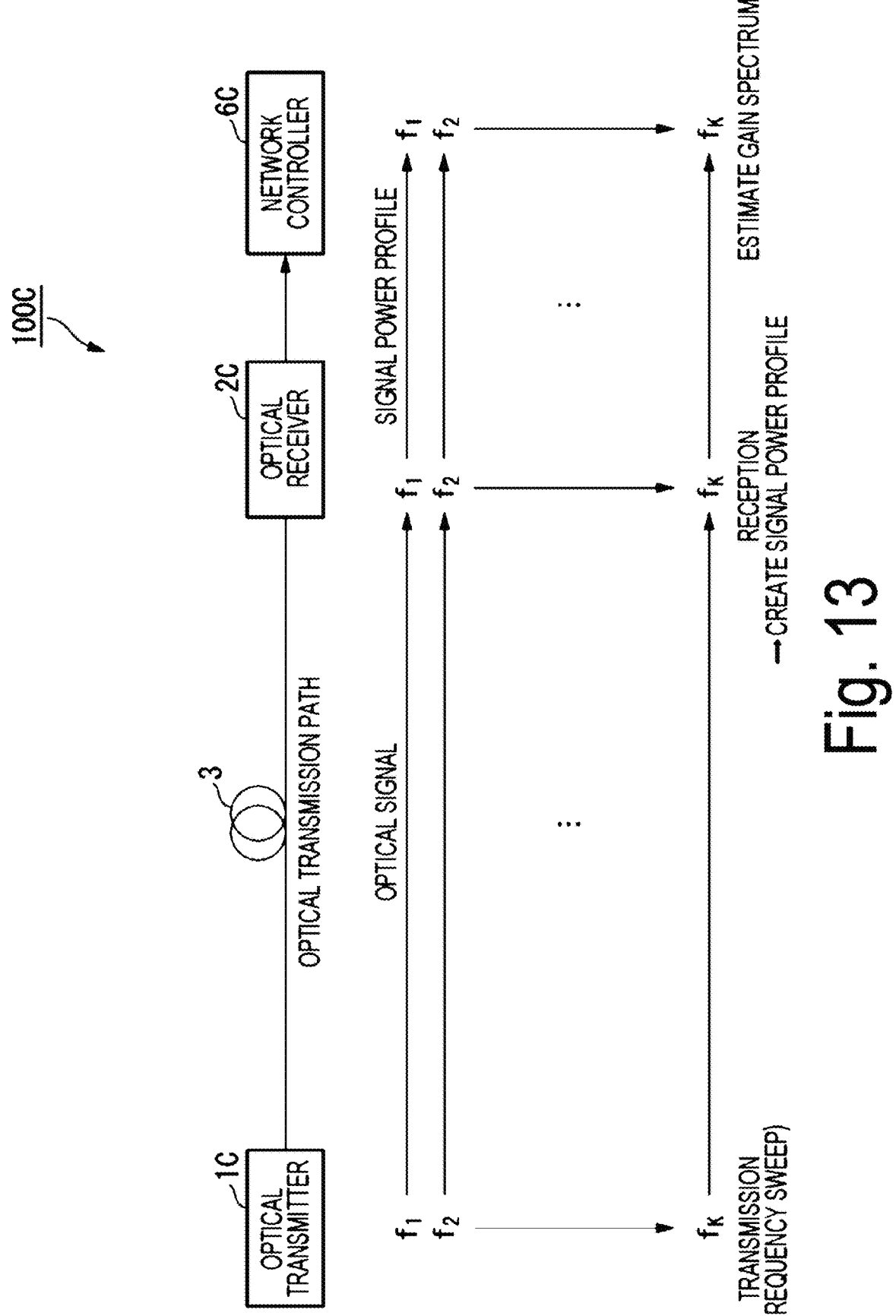
FIG. 13 is a diagram illustrating a modification example of the optical transmission system according to the embodiments.

FIG. 13 is a diagram illustrating a first modification example of the optical transmission system 100 according to the embodiments. While the optical transmission system 100 according to the above embodiments is configured such that the plurality of optical transmitters 1 transmit optical signals at mutually different channel frequencies, an optical transmission system 100C according to the first modification example is different from the optical transmission system 100 according to the embodiments in that the optical transmission system 100C includes one optical transmitter 1C, one optical receiver 2C, and a network controller 6C and the optical transmitter 1C transmits an optical signal while performing frequency sweep for the channel frequency of its own. Note that the network controller 6C according to the first modification example is similar to the network controller 6A according to the embodiments.

In this case, the digital signal processing unit 22 sequentially generates signal power profiles on the basis of the optical signals at different channel frequencies sequentially received through the frequency sweep and thereby acquires the signal power profiles for each of the plurality of channel frequencies, in the optical receiver 2C. The optical receiver 2C supplies the generated signal power profiles at each of the plurality of channel frequencies to the network controller 6C. The network controller 6C acquires the gain spectrum of each relay node 31 by a method similar to that of the network controller 6 in the embodiments, on the basis of the signal power profiles at the plurality of channel frequencies supplied from the optical receiver 2C.

According to such a configuration, it is not always necessary to prepare the sets of optical transmitters and the optical receivers in the same number as that of the channel frequencies, and it is thus possible to apply the method for estimating the gain spectra in the embodiments to an optical transmission system with a small scale.

Note that in a case where a plurality of sets of optical transmitters 1C and optical receivers 2C are present, the estimation of the gain spectra may be performed by using any one of the sets, or the gain spectra may be estimated by using a plurality of sets by splitting the frequency band to be swept.

Second Modification Example

In the first modification example, the gains of the optical amplifiers are estimated by using only one channel. In this case, other channels are not present, and the gains of the relay nodes 31 (light amplifiers) can thus be gains that are different from those in operation of performing wavelength multiplexing. In order to avoid this, the optical transmitter 1C and the optical receiver 2C may be configured to estimate the gain spectra while preparing and transmitting dummy light or other signals at other wavelengths by using another optical transmitter.

Third Modification Example

Although the case where the optical receiver 2 generates signal power profiles and the network controller 6 acquires gain spectra on the basis of the signal power profiles has been described in the above embodiments, the function of generating the signal power profiles may be mounted on the network controller 6. Specifically, the digital signal processing unit 22 of the optical receiver 2 may be included in the network controller 6. In this case, the optical receiver 2 may be configured to supply an optical signal received by the coherent receiver 21 to the network controller 6.

Fourth Modification

Figure 14:
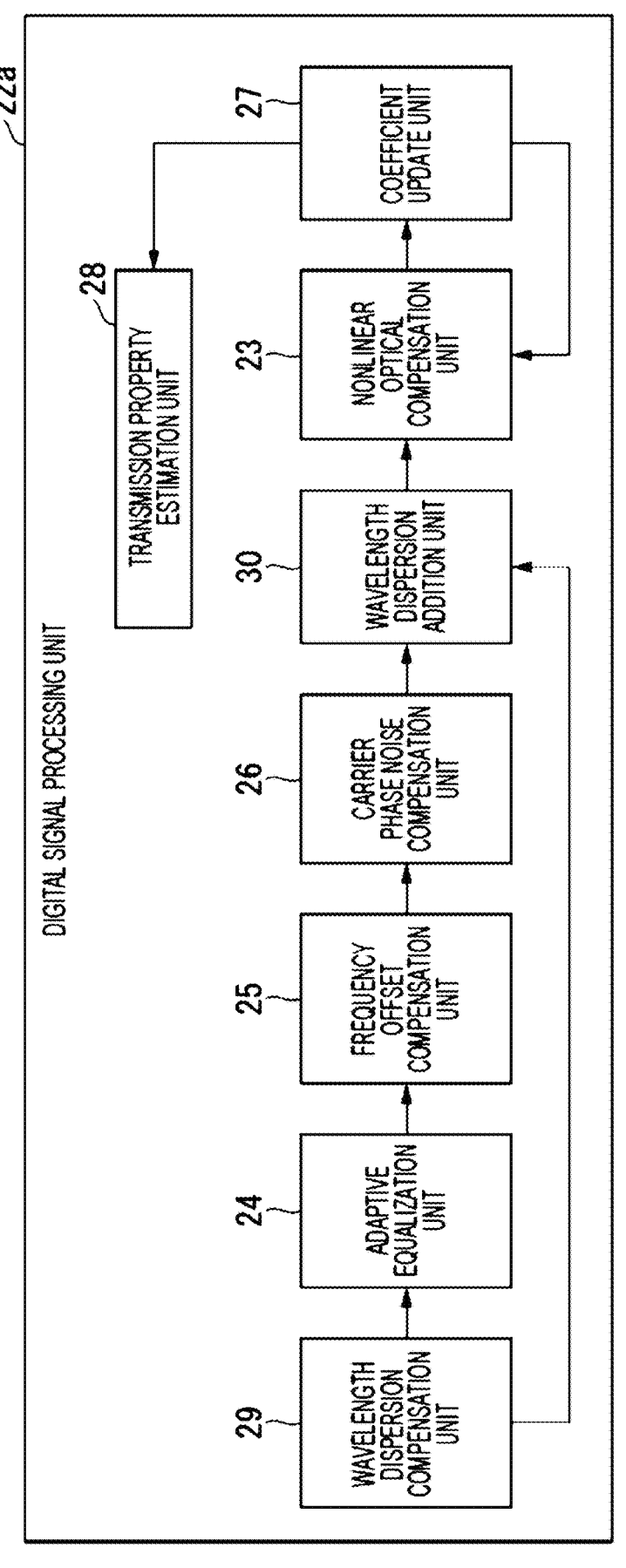
FIG. 14 is a diagram illustrating a modification example of a digital signal processing unit.

FIG. 14 is a diagram illustrating a modification example of the digital signal processing unit 22. The digital signal processing unit 22 may be configured as a digital signal processing unit 22a illustrated in FIG. 14. The digital signal processing unit 22a includes a wavelength dispersion compensation unit 29, an adaptive equalization unit 24, a frequency offset compensation unit 25, a carrier phase noise compensation unit 26, a wavelength dispersion addition unit 30, a nonlinear optical compensation unit 23, a coefficient update unit 27, and a transmission property estimation unit 28. The digital signal processing unit 22a further includes the wavelength dispersion compensation unit 29 and the wavelength dispersion addition unit 30 in addition to the configuration of the digital signal processing unit 22.

The functions of the nonlinear optical compensation unit 23, the adaptive equalization unit 24, the frequency offset compensation unit 25, the carrier phase noise compensation unit 26, the coefficient update unit 27, and the transmission property estimation unit 28 are the same as those in FIG. 2, and description thereof will thus be omitted. The wavelength dispersion compensation unit 29 compensates for distortion due to wavelength dispersion occurring in the optical transmission path 3. Specifically, the wavelength dispersion compensation unit 29 performs wavelength dispersion compensation by multiplying a frequency domain reception signal by a predetermined value (for example, $\exp\hat{}(-j\beta_k\omega^2)$). The wavelength dispersion addition unit 30 is a functional unit that adds the wavelength dispersion compensated for by the wavelength dispersion compensation unit 29 to the signal again. Specifically, the wavelength dispersion addition unit 30 adds the wavelength dispersion by multiplying the frequency domain reception signal by a reciprocal (for example, $\exp\hat{}(+j\beta_k\omega^2)$) of the value multiplied by the wavelength dispersion compensation unit 29.

OTHER MODIFICATION EXAMPLES

The coefficient update unit 27 may perform the comparison between the output signals with the training signal at another location. Specifically, the optical receiver 2 may perform the comparison of the output signals with the training signal between the adaptive equalization unit 24 and the frequency offset compensation unit 25, between the frequency offset compensation unit 25 and the carrier phase noise compensation unit 26, or between the carrier phase noise compensation unit 26 and the coefficient update unit 27. Note that in a case where the comparison of the output signals with the training signal is performed between the carrier phase noise compensation unit 26 and the coefficient update unit 27 in the embodiments, the digital signal processing unit 22 is required to newly include a demodulation unit (not illustrated).

The transmission property estimation unit 28 may perform estimation of the transmission property at another location. Specifically, the transmission property estimation unit 28 may perform the estimation of the transmission property after the processing performed by the adaptive equalization unit 24, after the processing performed by the frequency offset compensation unit 25, or after the processing performed by the carrier phase noise compensation unit 26.

The estimation of the transmission property may be performed through online processing within a chip configuring the digital signal processing unit 22 of the optical receiver 2 or may be performed through offline processing by extracting a reception signal from the optical receiver 2. In a case where the estimation is performed through offline processing, all the functional units included in the digital signal processing unit 22 are provided in an external device such as an external computer. The external device acquires a signal immediately before entering the nonlinear optical compensation unit 23 and performs processing similar to the processing described in each of the above embodiments.

Although the comparison between the reception signals and the training signal is performed after the adaptive equalization processing, the frequency offset compensation, and the phase offset compensation in the embodiments, the comparison between the reception signals and the training signal may be performed between the nonlinear optical compensation unit 23 and the adaptive equalization unit 24 (see Patent Literature 1, for example).

Some or all of the optical transmitter 1, the optical receiver 2, the relay node 31, and the network controller 6 may be realized by a computer. In that case, a program for implementing these functions may be recorded in a computer-readable recording medium, and the program recorded in the recording medium may be read and executed by a computer system to implement the functions. Note that the "computer system" mentioned herein includes an OS and hardware such as peripheral devices. The "computer-readable recording medium" refers to a portable medium such as a flexible disk, a magneto-optical disc, a ROM, or a CD-ROM, or a storage device such as a hard disk included in the computer system. The "computer-readable recording medium" may include a medium that dynamically stores the program for a short time, such as a communication line in a case where the program is transmitted via a network such as the Internet or a communication line such as a telephone line, and a medium that stores the program for a certain period of time, such as a volatile memory inside the computer system serving as a server or a client in that case. In addition, the above program may be for implementing some of the functions described above, may be one that can implement the functions described above in combination with a program already recorded in the computer system, or may be one implemented by using a programmable logic device such as a field programmable gate array (FPGA).

Although the embodiments of the present invention have been described in detail with reference to the drawings, specific configurations are not limited to the embodiments, and include design and the like within a range without departing from the gist of the present invention.

INDUSTRIAL APPLICABILITY

The present invention can be applied to an optical transmission system that performs communication by a wavelength division multiplexing (WDM) scheme.

REFERENCE SIGNS LIST 100, 100A, 100B, 100C Optical transmission system
1, 1A, 1C Optical transmitter
2, 2A, 2C Optical receiver
21 Coherent receiver
22 Digital signal processing unit
23 Nonlinear optical compensation unit
231 Linear compensation unit
232 Nonlinear compensation unit
233 Fourier transform unit
234 Wavelength dispersion compensation unit
235 Inverse Fourier transform unit
24 Adaptive equalization unit
25 Frequency offset compensation unit
26 Carrier phase noise compensation unit
27 Coefficient update unit
28 Transmission property estimation unit
3 Optical transmission path
31, 31A, 31B Relay node
311 Optical amplifier (light amplifier)
312 Optical filter
32 Attenuator
4 Multiplexer (MUX)
5 Demultiplexer (DEMUX)
6, 6A, 6B, 6C Network controller

The invention claimed is:

1. An optical transmission system in which one or more optical transmitters and one or more optical receivers perform communication via an optical transmission path,
wherein the optical transmission path includes a plurality of relay nodes including optical amplifiers that amplify optical signals,
the one or more optical transmitters transmit optical signals at a plurality of channel frequencies, the one or more optical receivers estimate variations in intensities of the optical signals on the optical transmission path for each of the plurality of channel frequencies, and
the optical transmission system comprises:
a network controller that acquires estimation information indicating a result of estimating the variations from the one or more optical receivers and acquires gain spectra of the optical amplifiers in the optical transmission path on the basis of the acquired estimation information.

2. The optical transmission system according to claim 1, wherein the one or more optical transmitters are a plurality of optical transmitters configured to transmit optical signals at mutually different channel frequencies, and
the one or more optical receivers are a plurality of optical receivers which receive a respective optical signal transmitted by an optical transmitter associated with the optical receiver itself and estimate the variations in intensity of the received respective optical signal on the optical transmission path.

3. The optical transmission system according to claim 1, wherein the one or more optical transmitters are a plurality of optical transmitters configured to transmit optical signals while sweeping a frequency band that is different from the other optical transmitters, and
the one or more optical receivers are a plurality of optical receivers which receive a respective optical signal transmitted by an optical transmitter associated with the optical receiver itself and estimate variations in intensity of the received respective optical signal on the optical transmission path for each channel frequency swept in the frequency band.

4. The optical transmission system according to claim 1, wherein the network controller acquires the gain spectra at positions in accordance with positions of the relay nodes on the optical transmission path on the basis of the estimation information acquired from the one or more optical receivers.

5. The optical transmission system according to claim 1, wherein the network controller compensates for a gain tilt of each relay node through feedback control based on the acquired gain spectra.

6. The optical transmission system according to claim 5, wherein the network controller adjusts pump wavelengths or pump powers of the optical amplifiers of the relay nodes such that the gain spectra of the relay nodes have a predetermined shape through the feedback control or levels the intensities of the optical signal at each channel frequency by causing inverse functions of the gain spectra to act on wavelength selection functions of the relay nodes.

7. An optical transmission method comprising, in an optical transmission system in which one or more optical transmitters and one or more optical receivers perform communication via an optical transmission path:
by the optical transmission path, amplifying optical signals by optical amplifiers in a plurality of relay nodes and relaying the optical signals;
by the one or more optical transmitters, transmitting optical signals at a plurality of channel frequencies;
by the one or more optical receivers, estimating variations in intensities of the optical signals on the optical transmission path for each of the plurality of channel frequencies; and
by a network controller, acquiring estimation information indicating a result of estimating the variations from the one or more optical receivers and acquiring gain spectra of the optical amplifiers in the optical transmission path on the basis of the acquired estimation information.

* * * * *